Jan. 13, 1953　　　J. G. MYERS　　　2,625,005
HOIST HOOK ASSEMBLY
Filed June 12, 1947
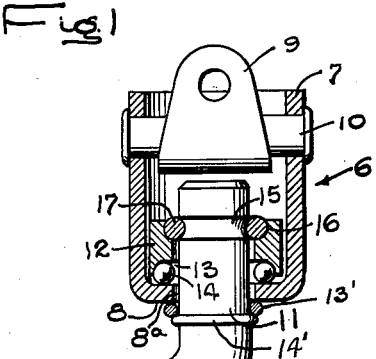
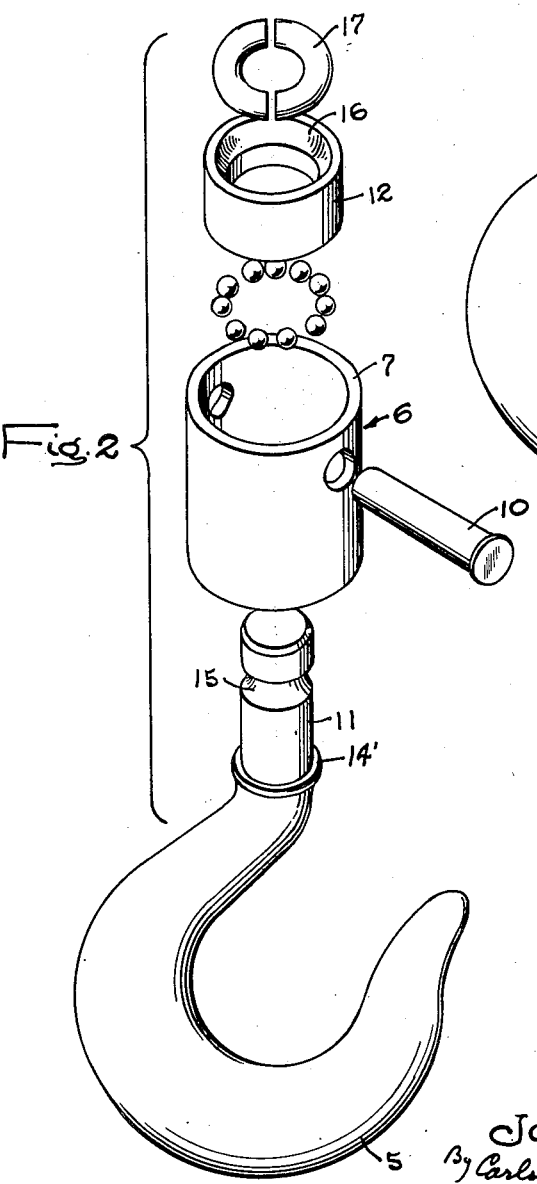
INVENTOR
John G. Myers
By Carlson, Pitzner, Hubbard & Wolfe
ATTORNEY

UNITED STATES PATENT OFFICE 2,625,005

HOIST HOOK ASSEMBLY

John G. Myers, Grand Haven, Mich., assignor to Keller Tool Company, Grand Haven, Mich., a corporation of Michigan Application June 12, 1947, Serial No. 754,233

1 Claim. (Cl. 59—95)

The invention relates to load hook assemblies for hoists and the like, and more particularly to load hook assemblies of the type in which the hook element is supported for swiveling movements.

Load hook assemblies of the above general character ordinarily comprise a holder which is connected to the load chain or cable and to which a hook element is securely anchored in a manner permitting rotation of the hook relative to the holder. In such hook assemblies, the hook is usually anchored to the holder by means of a nut screw-threaded to the shank of the hook element.

When failures occur in the hook assemblies, they are usually due to breaking of the threaded portion of the shank. This is the case even when the hook shanks are made sufficiently large to provide an ultimate strength theoretically much greater than the maximum load for which the hook is designed. Such breaks apparently result from a gradual weakening or fatigue of the metal due to the subjection of the hook to repeated shocks or stresses of small magnitude, coupled with the sharp edges of the bottom of the thread which define distinct lines of rupture.

With the above in view, the primary object of the invention is to overcome the above difficulties and to provide a load hook assembly which has greater fatigue resistance and is therefore safer in use.

A more specific object is to provide a load hook assembly utilizing a one-piece holder and having the hook element secured thereto by novel connecting means which provides a very strong connection and completely eliminates the factors causing breakage of the hook.

Other objects and advantages of the invention will become apparent from the following detailed description of the preferred embodiment illustrated in the accompanying drawing, in which:

Figure 1 is a side view of a load hook assembly embodying the features of the invention, the holder portion of the assembly being sectioned to show details of construction.

Fig. 2 is an exploded perspective view of the load hook assembly.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

The improved load hook assembly in its preferred form comprises a hook element 5 of forged steel or the like and of conventional shape mounted for swiveling movement in a holder 6 adapted to be connected to the lifting member of a hoist. As herein shown, the holder 6 comprises a generally cup-shaped member having a cylindrical side wall 7 and a transverse bottom wall 8, the latter serving as a support for the hook element 5. A connecting element 9 secured to the body 7 of the holder by a cross pin 10 provides for connection of the hook assembly to a hoist cable or chain.

In accordance with the invention, the hook element 5 is anchored in the holder 6 in a novel manner which effectually secures the parts together for relative swiveling movement without unduly weakening the hook element or rendering it subject to fatigue in use. For this purpose the hook element 5 is formed with a cylindrical shank 11 adapted to extend into the holder 6 through an aperture 8ᵃ in the transverse wall 8. Mounted on and encircling the shank 11 within the holder and rigidly secured thereto is an annular thrust member or collar 12 having a recess in its lower end defining an annular bearing race 13. Antifriction bearings such as balls 14 interposed between the bearing race and the transverse wall 8 of the holder support the hook element 5 and permit it to turn easily under load. A filler ring 13' inserted between the underside of the wall 8 and a circumferential flange 14' on the shank 11 prevents undesirable movements of the hook and bearings relative to the holder.

For securing the thrust collar 12 to the shank 11 of the hook element, the shank is formed with a shallow, rounded circumferential groove 15 and the collar 12 is formed with a registering internal circumferential recess 16 which cooperate to define an annular channel for the reception of a locking ring 17. As shown in Fig. 1, the depth of the groove 15 and the transverse depth of the recess 16 are slightly less than the radius of the ring 17 thus providing a slight clearance between the shank 11 and the inner wall of the collar 12. It will be observed that the depth of the recess 16, measured longitudinally of the collar 12 is substantially equal to the diameter of the ring 17, so that the latter is substantially enclosed therein when the parts are assembled. Moreover, the recess 16 is rounded at its lower end to provide a thrust seat for engagement by the ring.

The locking ring is preferably constructed in two parts or sections and, in the assembly of the hook element with the holder, is inserted with a press fit in the channel formed by the groove 15 and recess 16. When thus assembled, the ring 17 forms an abutment cooperating with the collar 12 to prevent withdrawal of the shank of the hook therefrom. Due to the shape and relationship of the groove 15 and recess 16, loads imposed on the hook element tend to wedge the ring more firmly into the same so that accidental separation of the hook from the holder is effectually prevented. A very strong connection is thus provided without the use of threads on the shank 11, thereby eliminating any danger of the shank breaking when subjected to long and hard use.

It will be apparent from the foregoing that the invention provides a load hook assembly of novel and advantageous construction. By reason of the novel means utilized for anchoring the hook element to the holder, threading of the shank of the hook is avoided, thus eliminating the main cause of fatigue ruptures of such hooks.

I claim as my invention:

A hook assembly comprising, in combination, a hook holder having a transverse wall defining an aperture therein, a retaining collar supported on one side of said wall and defining an opening therethrough substantially commensurate in size with said aperture and disposed in concentric relation thereto, said collar defining therein an annular recess extending around said opening at the end thereof remote from said wall, said recess presenting a surface of concave cross section facing radially inwardly and outwardly from said wall, a hook having an elongated shank thereon projecting through said aperture and said opening, the end of said shank remote from said hook being generally cylindrical in shape and defining therein a circumferential groove presenting a concave surface facing radially outward and adapted to register with said collar recess, said shank including a section thereof having a cross sectional size limited by the size of said aperture and extending from said groove toward the hook proper for a distance substantially greater than the distance from said collar recess to the remote side of said wall to enable said shank to be shifted inwardly through said aperture to dispose said shank groove beyond its normal position of registration with said collar recess, an annular split ring of generally circular cross section seated in said groove when said shank is in said inward position, said shank being shiftable outwardly through said aperture to seat said split ring in said recess, and said concave surfaces of said shank groove and said collar recess serving to wedge said split ring between said shank and said collar as an incident to the application of tensile forces to said shank.

JOHN G. MYERS.

REFERENCES CITED

The following references are of record in the file of this patent:

UNITED STATES PATENTS

| Number | Name | Date |
|---|---|---|
| 933,625 | Clarkson | Sept. 7, 1909 |
| 1,150,892 | Sherwood | Aug. 24, 1915 |
| 1,454,587 | Gunn | May 8, 1923 |
| 1,594,930 | Davis | Aug. 3, 1926 |
| 1,916,233 | Riblet | July 4, 1933 |
| 2,278,625 | Traylor et al. | Apr. 7, 1942 |
| 2,317,889 | Danneman | Apr. 27, 1943 |
| 2,493,282 | Criswell | Jan. 3, 1950 |